United States Patent
Popper

(10) Patent No.: US 8,518,144 B2
(45) Date of Patent: Aug. 27, 2013

(54) ESR MELTING OF NITI ALLOYS

(76) Inventor: Michael K. Popper, Sewickley, PA (US)

( * ) Notice: Subject to any disclaimer, the term of this patent is extended or adjusted under 35 U.S.C. 154(b) by 116 days.

(21) Appl. No.: 13/266,944

(22) PCT Filed: May 7, 2010

(86) PCT No.: PCT/US2010/034027
§ 371 (c)(1),
(2), (4) Date: Oct. 28, 2011

(87) PCT Pub. No.: WO2010/129862
PCT Pub. Date: Nov. 11, 2010

(65) Prior Publication Data
US 2012/0042749 A1    Feb. 23, 2012

Related U.S. Application Data

(60) Provisional application No. 61/176,225, filed on May 7, 2009.

(51) Int. Cl.
*C22C 19/03*    (2006.01)
*C22B 9/18*    (2006.01)
*C22B 9/20*    (2006.01)
*C22B 9/04*    (2006.01)

(52) U.S. Cl.
USPC ........................................ 75/10.25; 75/10.64

(58) Field of Classification Search
USPC ............... 420/590; 75/10.64, 10.25
See application file for complete search history.

(56) References Cited

U.S. PATENT DOCUMENTS 4,282,033 A * 8/1981 Goldstein et al. ............. 420/441
2007/0131317 A1 * 6/2007 Broadley et al. .............. 148/556

FOREIGN PATENT DOCUMENTS

JP    62063626 A  *  3/1987

OTHER PUBLICATIONS

Derwent Acc No. 2009-G46563 for Patent Family including CN 101381820 A by Gao, M et al. Published Mar. 11, 2009.*
J.C. Stoephasius, "ESR Refining Potential for Titanium Alloys Using a CaF2-based Active Slag" Advanced Engineering Materials, vol. 9, No. 4, Apr. 1, 2007, pp. 246-252.
Ming H. Wu, "Fabrication of Nitinol Materials and Components" Proceedings of the International Conference on Shape Memory and Superelastic Technologies; Kunming China, Jan. 1, 2001, pp. 1-8.
International Search Report of PCT/US2010/034027 dated Jul. 2, 2010.
Written Opinion of the International Searching Authority for PCT/US2010/034027 dated Jul. 2, 2010.

* cited by examiner

*Primary Examiner* — George Wyszomierski
*Assistant Examiner* — Tima M McGuthry Banks
(74) *Attorney, Agent, or Firm* — Buchanan Ingersoll & Rooney PC

(57) ABSTRACT

In a method for forming high purity NiTi alloys conventionally formed NiTi alloy containing inclusions is melted with a slag forming material which will chemically react with the inclusions. The slag forming material preferably is or contains $CaF_2$ and some free calcium.

6 Claims, No Drawings

US 8,518,144 B2

ESR MELTING OF NITI ALLOYS

CROSS-REFERENCE TO RELATED APPLICATIONS

This application claims the benefit of Provisional Patent Application Ser. No. 61/176,225 entitled "Method of ESR Melting of NiTi Alloys", filed on May 7, 2009, the entire disclosure of which is incorporated by reference herein.

FIELD OF THE INVENTION

The invention relates to methods for making NiTi alloys.

BACKGROUND OF THE INVENTION

Nitinol alloys (also known as nitinol and shaped memory alloys), are shape recoverable alloys of nickel and titanium that, after either heating or cooling (as a function of the specific nitinol alloy under consideration) recover their original shape after the thermal process is reversed, i.e. heated metal is cooled or cooled metal is heated. These alloys are used in numerous critical medical applications. Their use normally is as a fine guide wire for interventional catheters, and for cardiac and peripheral stents to open blocked or partially blocked arteries, and related applications. All of these applications require fine cross sections of wire or tubing. In some cases the wire may be no more than ten to fifteen thousandths of an inch (0.0025 to 0.0038 cm) in diameter and the tubing wall similar or thinner thicknesses. Major limiting factors in the fatigue life of these devises are refractory inclusions in the metal. Refractory inclusions may be oxides, nitrides, carbides, metal oxy-nitrides and related compounds. These inclusions, while small, often are a large portion or percentage of the diameter of the fine wire or of the thickness of the thin walled tube used to make stents. These inclusions act as hard spots in the otherwise ductile alloy. While flexing in use in the heart or other in vitro sites, the softer metal flexes and can in effect break or fatigue around the hard inclusions in the metal.

These inclusions also render it difficult to fabricate the finely dimensioned wire or tube itself. Significant economic loss is incurred if fine wire or tube is drawn 90-95% of the way to its ultimate gage or thickness but cannot be finished due to inclusions. Further, fatigue failures due to inclusions or any reason, are not at all desirable when they occur in an alloy implanted in a patient Inclusions are classically sourced to one of three origins. The first is surface or in solution gases found on or in the raw materials used to produce an alloy, in the case of nitinol, this would be nickel and titanium and to a lesser degree, chrome, niobium, copper, iron, platinum and other metals. These gases may be oxygen, nitrogen or carbon in elemental forms or otherwise tied up as some compound in the metal. The second possible source of inclusions is from contact with the refractory materials that contain the metals during melting. In the case of nitinol, this is almost exclusively graphite. Contact with graphite can generate carbide inclusions in the nitinol alloys.

The third source of inclusions in nitinol is from residual air left in the vacuum atmosphere of the melt furnace. This residual air, present as nitrogen gas, oxygen gas and perhaps a small amount of carbon, is available during the melt to react with the molten metal and to form deleterious oxides, carbides, metal oxy-nitrides, and nitrides. These in turn have the aforementioned affect as inclusions in metals, as hard spots, and fatigue limiting defects.

Efforts to date have been to reduce inclusions by techniques in primary ingot production, or the first melt of the alloy. These efforts include the use of the lowest oxygen and lowest nitrogen raw materials possible. They also include operating the melt furnace under the most rigorous vacuum regimes in order to preclude the introduction of gaseous elements left from the evacuated air.

To date, the net sum of all of the above efforts to reduce inclusions has been satisfactory for the state of the art as it is practiced today. Demands from the medical community to produce cleaner, more defect free nitinol alloys that will allow for longer fatigue lives of devices are continuing. Research is ongoing to develop cleaner alloys at reasonable prices. But, prior to the present invention the art had not found a method for reliably and consistently making high purity nitinol alloys with greatly reduced inclusion levels.

Nitinol ingots from which nitinol mill products are produced are melted in one of several ways.

The first melt technique is to assemble all of the alloy constituents and melt them more than one time and as many as five or six times in a Vacuum Arc Remelt (VAR) furnace. This technique produces useable product for current generations of nitinol devices. However, the repetitive melting allows two deleterious actions to occur. Each time the ingot is melted, slight additional amounts of oxygen and nitrogen are introduced into the ingot. These gaseous elements may occur in the alloy as oxides or nitrides or metal oxy-nitrides, or they may become solutes and occur as interstitial gases in the alloy. The former direct occurrence of oxides, nitrides and metal oxy-nitrides has already been established as undesirable. Recent work has demonstrated that the occurrence of gases as interstitial elements in a nitinol alloy allows the gases to be available to form or grow oxides or nitrides during the numerous hot working and annealing cycles necessary to produce final wire and tubing for use in implants.

The second melt technique is to melt the alloy constituents in a Vacuum Induction Furnace (VIM) using graphite crucibles. Then this primary VIM ingot is re-melted at least one time in a VAR to form a larger ingot. In addition to the inclusion forming mechanisms mentioned above in the first technique of multiple VAR melting, the VIM melting in graphite crucibles allows for the formation of many carbide inclusions in the alloy. When more than one final melt VAR ingot is used in association with this method, inclusions tend to agglomerate in the melt and become larger and therefore considerably more undesirable for the stated end applications.

The third method is to Induction Skull Melt in a water cooled copper induction heated crucible and produce an initial ingot. Like method two above, this ingot is then re-melted into a larger VAR ingot. This technique generates fewer or no graphite sic carbide inclusions as noted in method two. The inclusions found in ingots from method three are related more to raw materials and inadequate vacuum regimes.

In some cases a fourth method of directly processing as VIM melted ingots that were melted in graphite crucibles is also used. Small ingots are made using this technique. The technique allows for the introduction of multiple carbide inclusions.

Electroslag remelting (ESR), also known as ESR melting, was developed in the 1930s, but it took approximately 30 years before it became an acknowledged process for mass producing tool steels, superalloys and some nickel-based alloys. This process provides a chemically active slag that both protects a melt from contamination by constituents in the atmosphere and, may be effective to scrub, capture or otherwise remove, already existing inclusions in metal. In the case of critical rotating components for aircraft jet engines, certain specifications call for the primary melting of an alloy in a VIM, a subsequent re-melting of the alloy via ESR under protective slag designed to remove inclusions generated in the VIM, and then a final melting in VAR to develop the correct metallurgical structure to prepare the ingot for a subsequent hot working operations.

Because of the highly reactive nature of the titanium portion of the alloy ESR was never considered to be suitable for use in making NiTi alloys. Early development of nitinol alloys required the rigorous vacuum procedures already discussed. Growth in the nitinol industry followed already existing melting techniques, which did not include ESR. Subsequently, however, calcium fluoride (sometimes written $CaF_2$ or CaFl) slag has been used to melt and weld other titanium alloys with significant success. Titanium is the most reactive component of the nitinol alloy. It contributes the vast majority of the inclusion forming constituents of the final alloy. Therefore, a concern for the high reactivity of titanium disproportionately addresses most of the concerns for inclusion generation in the alloy system. Nevertheless, those skilled in the art still did not consider ESR to be useful in melting nitinol alloys.

SUMMARY OF THE INVENTION

I provide a cost efficient process for melting NiTi alloys that reduces inclusions in nitinol alloys and thereby extends the life of the implanted devices made from this alloy. I melt conventionally formed NiTi alloys using ESR with a calcium fluoride slag. I prefer that the slag be enriched with a slight excess of calcium metal. The use of this technique may be either as a secondary melt or a final melt in the nitinol melting sequence, or as an intermediate "inclusion reduction and cleansing melting' prior to the final VAR melt to produce a useable final ingot.

DESCRIPTION OF THE PREFERRED EMBODIMENTS

The present method utilizes NiTi alloys that have been made with any known melting process for making NiTi alloys including the techniques discussed above. The conventional NiTi alloy is melted with certain slags or fluxes under certain conditions that are designed to remove, solutionize or reduce refractory inclusions left in nitinol alloys after the primary ingot consolidation. The use of ESR may be as an intermediate melt for the above mentioned reasons, or for a final melt. Final melt ingot is ingot that is finished all melt processing stages, and is ready to be hot processed into useable mill shapes.

If ESR is used as an intermediate melt only for the purposes of removing inclusions as laid out here, then the final melt in the sequence may continue to be a VAR melt.

ESR, or electro slag remelting, uses an engineered slag to cover the molten metal being remelted. The slag is able to chemically eliminate or reduce inclusions in the metal being re-melted by reacting with the inclusions in the molten metal in such a way as to dissolve them or mechanically entrain them in the slag and remove them. I prefer to provide a slag that contains calcium. I further prefer that the at least some of the calcium be in the form $CaF_2$. The most preferred embodiment of my method I provide a slag that contains both $CaF_2$ and free calcium.

The excess of the calcium metal in the slag should be that amount of calcium necessary to reduce the in solution oxygen in the primary melt metal and further to reduce and eliminate already formed titanium oxides in the NiTi alloy. Using a slag with an excess of calcium metal will help to remove in solution oxygen, and thereby reduce the possibility for the oxygen to form inclusions during any final melting in the VAR, or to occur as precipitates during cold working and annealing of the alloy.

EXAMPLES

Initially a combination of titanium particles or titanium sponge is blended with nickel particles or nickel pellets and any minor third or fourth elements. This combination of metal particles is melted under vacuum using one of the three melt methods already noted Vacuum Induction Furnace Melt Vacuum Arc Remelt, Vacuum Arc Remelt Vacuum Arc Remelt or Induction Skull Melting Vacuum Arc Remelt (VIM VAR, VAR VAR, or ISM VAR) and poured into a chill mold to produce a primary or first melt nitinol ingot. The ingot is then tested to insure that it met the requirements of the nitinol alloy in general chemical composition, and other parameters.

The primary melted ingot is then remelted in an ESR melt furnace with a slag forming material. In one embodiment the slag forming material is composed of a high purity $CaF_2$, commonly called fluorspar. In an alternative embodiment an excess of metallic calcium is added to the $CaF_2$ slag/flux. The excess calcium should be 2-5% of the total weight of the slag/flux. This $CaF_2$—Ca slag is introduced into the bottom of a water cooled crucible and melted prior to the start of the melt of the nitinol using what is commonly referred to in ESR melting as a cold start procedure. This ESR system must be capable of being sealed, evacuated and back purged with a positive pressure of argon prior to commencement of the actual melt. The argon purge prevents the re-oxidation of the nitinol alloy in the event that the slag cover of the molten metal is not continuous at the start of the melt.

During the ESR melt, the $CaF_2$—Ca flux will capture, re-solutionize, or otherwise dissolve or reduce inclusions that are present in the nitinol from the primary melt that has already been performed.

While I have described certain present preferred embodiments of my process for making NiTi alloys, it should be understood that various modifications could be made without departing from the spirit and scope of the present invention. Those skilled in the art will appreciate that various other modifications and alterations could be developed in light of the overall teachings of the disclosure. The presently preferred embodiments described herein are meant to be illustrative only and not limiting as to the scope of the invention, which is to be given the full breadth of the appended claims and any and all equivalents thereof.

I claim:

1. A method for preparing high purity NiTi alloy comprising:

melting at least one of titanium particles and titanium sponge with at least one of nickel particles and nickel pellets along with any desired minor elements under vacuum using Vacuum Induction Furnace Melt Vacuum Arc Remelt, Vacuum Arc Remelt Vacuum Arc Remelt or Induction Skull Melting Vacuum Arc Remelt to make NiTi alloy having inclusions;

placing the NiTi alloy having inclusions in an eletroslag remelting furnace with a $CaF_2$ slag forming material which will chemically react with the inclusions when the alloy is melted;

melting the NiTi alloy with the slag forming material to form molten NiTi alloy and slag; and separating the slag from the molten NiTi alloy.

2. The method of claim 1 wherein the inclusions are selected from the group consisting of metal oxides, metal nitrides and metal oxy-nitrides.

3. The method of claim 1 wherein the slag forming material also contains free calcium.

4. The method of claim 1 also comprising allowing the molten NiTi alloy to cool and re-melting the NiTi alloy.

5. The method of claim 4 wherein the NiTi alloy contains inclusions after the alloy is cooled and is remelted with a slag forming material which will chemically react with the inclusions when the alloy is remelted to form molten NiTi alloy and slag; and further comprising separating the slag from the molten NiTi alloy.

6. A method for preparing high purity NiTi alloy comprising:

melting at least one of titanium particles and titanium sponge with at least one of nickel particles and nickel pellets along with any desired minor elements under vacuum using Vacuum Induction Furnace Melt Vacuum Arc Remelt, Vacuum Arc Remelt Vacuum Arc Remelt or Induction Skull Melting Vacuum Arc Remelt to make NiTi alloy having inclusions;

placing the NiTi alloy having inclusions in an electroslag remelting furnace with a slag forming material that contains calcium which will chemically react with the inclusions when the alloy is melted;

melting the NiTi alloy with the slag forming material to form molten NiTi alloy and slag; and separating the slag from the molten NiTi alloy.

\* \* \* \* \*